United States Patent [19]
Mann

[11] Patent Number: 5,174,150
[45] Date of Patent: Dec. 29, 1992

[54] DEVICE AND METHOD FOR REDUCING FALSE INDICATIONS OF LEAKAGE IN A DOUBLE-WALL TANK

[75] Inventor: William G. Mann, Laramie, Wyo.

[73] Assignee: In-Situ, Inc., Laramie, Wyo.

[21] Appl. No.: 784,581

[22] Filed: Oct. 29, 1991

[51] Int. Cl.⁵ ............................................ G01M 3/04
[52] U.S. Cl. ........................................ 73/49.2; 73/40; 116/227
[58] Field of Search ............... 73/49.2, 49.5, 40.5 R, 73/49.1; 340/603, 605; 200/61.2, 61.21, 61.04; 116/217, 227, 218

[56] References Cited

U.S. PATENT DOCUMENTS

| | | | |
|---|---|---|---|
| 4,110,947 | 12/1978 | Murray et al. | 73/49.2 T |
| 4,672,366 | 6/1987 | Butts | 340/605 |
| 4,673,926 | 6/1987 | Gorman | 340/605 |
| 4,682,156 | 7/1987 | Wainwright | 340/603 |
| 4,712,505 | 12/1987 | Wainwright | 116/227 |
| 4,818,976 | 4/1989 | Schmitt et al. | 73/49.2 T |
| 4,827,246 | 5/1989 | Dolan et al. | 116/227 |
| 4,939,833 | 7/1990 | Thomas . | |
| 5,008,650 | 4/1991 | Hoiberg | 340/604 |

FOREIGN PATENT DOCUMENTS

| | | | |
|---|---|---|---|
| 2735804 | 2/1979 | Fed. Rep. of Germany | 73/49.2 T |
| 0219532 | 11/1985 | Japan | 73/49.2 T |

*Primary Examiner*—Herbert Goldstein
*Assistant Examiner*—Raymond Y. Mah
*Attorney, Agent, or Firm*—Sheridan Ross & McIntosh

[57] ABSTRACT

A device and a method are provided for reducing false indications of leakage between the inner and outer walls of a double-wall tank. The device reduces contact between a sensor assembly and condensation which forms between the walls, preferably comprising an isolation stand-off flange secured around a portion of the sensor assembly. The method comprises spacing the sensor assembly from the walls to reduce the potential for contact between the sensor assembly and condensation.

10 Claims, 2 Drawing Sheets

DEVICE AND METHOD FOR REDUCING FALSE INDICATIONS OF LEAKAGE IN A DOUBLE-WALL TANK

TECHNICAL FIELD OF THE INVENTION

The present invention relates to detection of leaks between the walls of a double-wall tank, and in particular, a device and method for reducing false indications of leakage.

BACKGROUND OF THE INVENTION

Underground tanks are frequently used for the storage of liquids, such as gasoline at service stations. Such tanks can be made of fiberglass, coated steel or other materials. While the integrity of most tanks is generally good, leaks occasionally occur resulting in the product contained within a tank escaping into the environment and/or ground water seeping into the tank and contaminating the product. Environmental concerns and resulting governmental regulations have led to the widespread use of double-wall tanks having an inner wall to contain the product and an outer wall surrounding the inner wall, with a small space separating the two.

The double-wall configuration serves two purposes. First, if a leak forms in the inner wall, the outer wall will prevent product from escaping into the external environment and possibly polluting the soil or ground water. Secondly, if a leak forms in the outer wall, the inner wall will prevent ground water from entering the inner tank and contaminating the product. Consequently, a breach in either wall will result in product or ground water being retained in the annular space between the walls, which is typically about 1 inch to $1\frac{1}{4}$ inches wide (although tanks with larger and smaller spacing are also used).

It can be appreciated that the detection of product or water within the annular space is extremely important. If a leak is detected and confirmed quickly, the tank can be repaired or, more typically, replaced before significant contamination occurs. Various devices have been proposed for detecting leaks, such as filling the annular space with a fluid and monitoring the hydrostatic pressure or electrical conductivity of the fluid. Another method employs a dye which is soluble in hydrocarbons but not water. The dye is lowered to the bottom of the annular space and periodically removed for inspection. If a leak of hydrocarbon liquid has occurred, the dye will have dissolved.

U.S. Pat. No. 4,682,156 by Wainwright, issued Jul. 21, 1987 and entitled "Solvent Detector," commonly assigned to the assignee of the present invention, is directed to the detection of solvents, including hydrocarbons, in a perforated well casing. The device employs a hydrocarbon-soluble filament which interconnects a mass and a weighing assembly, the latter being joined to an alarm indicator. The filament and mass are lowered into the well casing; hydrocarbons present in the space will dissolve the filament and allow the mass to fall free. The weighing assembly detects the resulting reduction of weight and triggers an alarm.

U.S. Pat. No. 4,712,505 by Wainwright, issued Dec. 15, 1987 and entitled "Combination Hazardous Liquid and Water Sensor," also commonly assigned to the assignee of the present invention, discloses an apparatus and a method for sensing the presence of product and/or water in the annular space between the walls of a double-wall tank. A product-sensing element and a water-sensing element are operatively associated with each other to control the compression of a spring. The spring is operatively connected to a colored marker which is able to move from within an opaque tube to within a transparent tube using the force of the spring. When the product-sensing element is contacted by product or the water-sensing element is contacted by water, the respective element weakens and the spring force moves the colored marker so that it is within the transparent tube to indicate that product or water is present in the annular space.

It can be appreciated that some sensors will not detect the presence of water or are not sensitive to the presence of small amounts of product or water. Conversely, with some sensors, particularly those designed to be particularly sensitive to the presence of even very small amounts of product or water, condensation which forms in the annular space can trigger false indications of leakage. Such condensation can form, for example, when the temperature of the product within the inner tank is different from the temperature of the ground outside the outer tank. This temperature difference may occur when product is added to the tank or when a manhole cover above a tank riser is warmed, such as by the sun. Condensation tends to form first on rough surfaces, such as the surfaces of the walls of a double-wall tank or on the surface of the cable used to connect a remote indicator to a sensor located at the bottom of the annular space. Such a cable typically is routed down the tank riser to the bottom of the annular space. Because the distance between the inner and outer walls may only be about 1 inch, the cable will generally follow the circumference of the outer wall. Consequently, condensation which forms within the annular space can run down either or both of the tank walls to the bottom of the annular space and can also run down the cable to the sensor. Furthermore, tanks are frequently installed in the ground with a slight angle to horizontal (about 1° to 2°) in order to enhance the pooling of leaked product or water to facilitate detection. However, pooling of condensation is also enhanced, increasing the likelihood that condensation will be detected by the sensor and producing a false indication of leakage.

Because an operator cannot determine in advance whether an indication of water in the annular space is a result of a leak or a result of condensation, all such indications must be checked out. This typically involves pulling the sensor assembly out from the annular space and visually inspecting it. And, because typical sensor elements can only be used once, replacement of the sensor element is required after contact with condensation. The sensor assembly must then be reinstalled in the bottom of the annular space. Manual inspection is time consuming and inconvenient and replacement of sensor elements is an undesired expense. Consequently, a need has arisen for a device and a method for reducing false indications of leakage due to condensation between the inner and outer walls of a double-wall tank.

SUMMARY OF THE INVENTION

In accordance with the present invention, a device and a method are provided for reducing false indications of leakage between the inner and outer walls of a double-wall tank. The device comprises means for substantially reducing contact between a sensor and condensation which forms in the annular space between the inner and outer walls. The device comprises means for spacing the sensor from the inner and outer walls. Preferably, the device comprises an isolation stand-off flange positioned around a portion of the sensor to separate the sensor from the tank walls and also to divert condensation which runs down the cable before it reaches the sensor assembly.

The device of the present invention has dimensions selected to permit the sensor to which it is secured to be lowered to the bottom of the annular space of a double-wall tank. When the sensor is in a substantially horizontal position at the bottom, the device provides a gap between the sensor and the surfaces of the tank walls. Thus, there is a reduced likelihood that condensation which forms in the annular space will come in contact with the sensor. However, product or water which infiltrates into the annular space in larger volume will be detected. Additionally, the device has a shape which enables it to act as a barrier between the cable and the sensor, thus reducing the likelihood that condensation which travels down the cable will contact the sensor.

In another embodiment, a method is provided for reducing false indications of leakage comprising the steps of providing a sensor in a double-wall tank and reducing the likelihood of contact of condensation with the sensor. Preferably, the method includes the step of spacing the sensor from the tank walls.

Consequently, the device and method of the present invention substantially reduce false indications of leakage caused by condensation.

DETAILED DESCRIPTION

Figure 2:
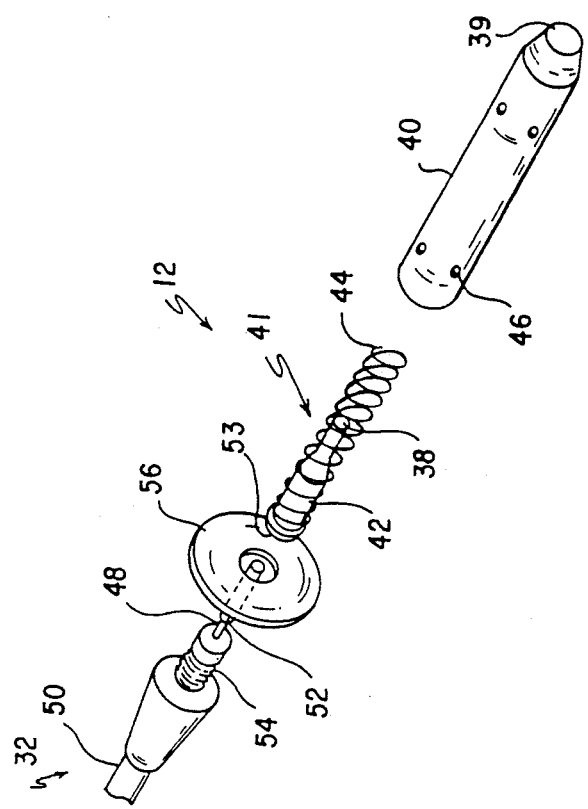
FIG. 2 is an exploded perspective view of a sensor assembly, including the isolation stand-off flange of the present invention.
Figure 1:
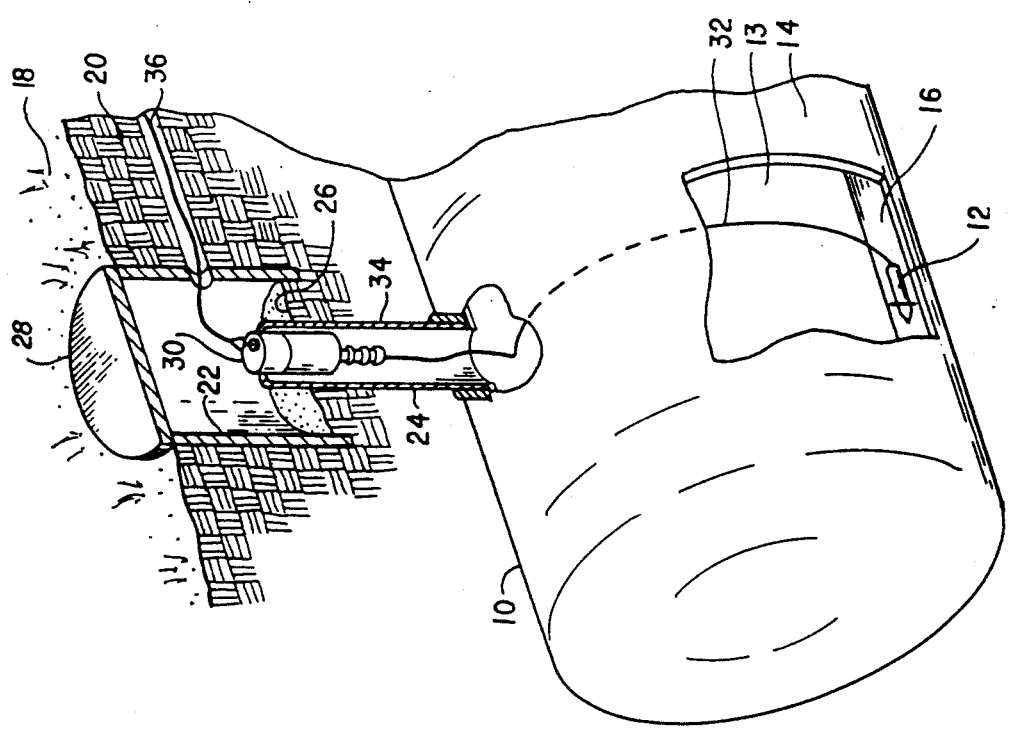
FIG. 1 is a perspective view of an underground double-wall tank with portions cut away to illustrate the placement of a sensor assembly.

FIG. 1 is a perspective view of an underground double-wall tank 10 with a portion cut away to illustrate the placement of a sensor assembly 12. The tank 10 includes an inner wall 13 and an outer wall 14, spaced from the inner wall 13 to form an annular space 16. The tank 10 is buried under the surface 18 of the ground 20; in a typical service station installation, the top of the tank 10 is about two to four feet beneath the surface 18. A manhole 22 provides access to a tank riser 24 which projects above a backfill level 26 within the manhole 22. A cover 28 seals the manhole 22 and a riser lid 30 seals the tank riser 24 The sensor assembly 12 is positioned at the bottom of the annular space 16 and, in the installation illustrated in the Figures, is attached to a mechanical control assembly 32 having an inner mechanical cable 48 and a protective outer casing 50 (FIG. 2). The control assembly 32 is connected to a riser adapter 34 in the tank riser 24. Also connected to the riser adapter 34 is one end of an electrical cable 36; the other end is connected to a remote indicator such as a light or bell (not shown). Within the riser adapter 34 is a device by which movement of the mechanical cable 48 within the control assembly 32 is converted into an electrical signal for transmission by the electrical cable 36 to the remote indicator. For example, a magnetic reed switch or other proximity detection device can be secured inside the riser adapter 34 and electrically connected to the electrical cable 36; a magnet can be secured to the mechanical cable 48. When the sensor assembly 12 causes the mechanical cable 48 to move within the casing 50, corresponding movement of the magnet activates the reed switch and a signal is transmitted to the remote indicator to indicate possible leakage in the tank 10. Also within the riser adapter 34 is a test handle for manually moving the mechanical cable 48 to test the operation of the entire system. It will be appreciated that FIG. 1 illustrates only one arrangement of the sensor assembly 12 in the annular space 16 of the tank 10. For example, the tank riser 24 and the manhole cover 28 could be positioned at one end of the tank 10 such that the control assembly 32, with the sensor assembly 12, drops straight down to the bottom of the annular space 16.

FIG. 2 illustrates an exploded view of the sensor assembly 12. It comprises a combination sensing element 41, having a water-sensing portion 38 and a product-sensing portion 42, positioned within a sensor guard 40. A spring 44 holds the sensing element 41 within the sensor guard 40 and, when compressed, biases it toward a closed tip 39 of the sensor guard 40. The spring 44 also repositions the sensing element 41 after the system is manually tested. Apertures 46 around the circumference of the sensor guard 40 permit water or leaked product to come into contact with the sensing element 41.

As previously described, the control assembly 32 includes the inner mechanical cable 48 and the protective outer casing 50. A crimp sleeve 52 is secured to an end of the mechanical cable 48 and fits into an opening 53 in one end of the sensing element 41.

When the members of the sensor assembly 12 are assembled, the opening 53 in the sensing element 41 receives the sleeve 52 through the opening 53. The sensor guard 40, with the spring 44 and the sensing element 41 positioned therein, is secured to the control assembly 32, such as by screwing it onto threads 54. The spring 44 is thus compressed between the tip 39 of the sensor guard 40 and the end of the threads 54. The opposite end of the control assembly 32 is threaded onto the lower end of the riser adapter 34 and one end of the electrical cable 36 is threaded or otherwise secured to the upper end of the riser adapter 34. A second spring (not shown) located in the riser adapter 34 urges the mechanical cable 48 and the sleeve 52 against the sensing element 41. However, the product-sensing portion 42 and the water-sensing portion 38 are sufficiently strong in the absence of product or water, respectively, to prevent the sleeve 52 and the mechanical cable 48 from pushing through the sensing element 41 within the sensor guard 40.

After assembly, the control assembly 32, with the sensor assembly 12, is lowered into the tank riser 24 and through the annular space 16 until the sensor assembly 12 rests on the bottom of the annular space 16. The riser lid 30 is then secured to the top of the tank riser 24 and the manhole cover 28 is secured to the top of the manhole 22.

The operation of the sensor assembly 12 and related mechanical and electrical members will now be described. If water enters the sensor assembly 12 through one or more apertures 46 and contacts the water-sensing portion 38, or if product enters the sensor assembly 12 through one or more of the apertures 46 and contacts the product-sensing portion 42, the respective sensing portion degrades and weakens and the spring in the riser adapter 34 causes the mechanical cable 48 and the sleeve 52 to move farther into the sensor guard 40 or to penetrate through the water-sensing portion 38. In the riser adapter 34, the magnetic reed switch (or similar device) is activated by the movement of the mechanical cable 48 and sends a signal through the electrical cable 36 to the remote indicator, thereby indicating the presence of water or product in the bottom of the annular space 16 of the tank 10.

Activation of the remote indicator can indicate the existence of a leak in either the inner wall 13 or outer wall 14 of the tank 10 or may merely be responsive to the presence of condensation in the annular space 16. In order to determine which of these conditions actually exists, the operator responding to the activation of the leak indicator must remove and inspect the sensor assembly 12. The operator notes the presence or absence of a petrochemical odor and may also disassemble the sensor assembly 12 for visual inspection for the presence of water and/or product. In the event nothing is revealed by these inspections, chemical analysis of fluids and vapors in the annular space 16 may be required. If no leak of water or product is actually detected, the sensor assembly 12 is replaced with a new sensor assembly and lowered to the bottom of the annular space 16. It can be appreciated that the entire removal, inspection and replacement process is time consuming and potentially expensive but that it must be carried out in all instances in order to reduce leakage and resultant contamination.

To reduce false indications of leakage, the present invention substantially reduces contact between the sensor assembly 12 and condensation which forms between the inner and outer walls 13 and 14 in the annular space 16. In the embodiment illustrated in FIG. 2, the device of the present invention comprises an isolation stand-off flange 56 to be positioned around a portion of the sensor assembly 12 or between the control assembly 32 and the sensor guard 40. It has been found that spacing the sensor assembly 12 as little as ⅛ of an inch from the inner surface of the outer wall 14 at the bottom of the annular space 16 substantially reduces contact between the sensor assembly 12 and condensation. To provide such spacing, the flange 56 preferably has a radius at least ⅛ of an inch greater than the radius of the sensor assembly 12. The flange 56 should not have so large a diameter, however, that it will prevent the sensor assembly 12 from passing between the inner and outer walls 12 and 14 of the tank 10. The spacing between the walls is typically about 1¼ inches. Preferably, therefore, the flange 56 should have a diameter of about 1 inch.

To enhance the effectiveness of the flange 56 of the present invention, it is also preferable that it be formed from a water repellant material such as, for example, a material identified by the trademark DELRIN®(a registered trademark of DuPont, having water repellant properties). When employing such a material, the likelihood is reduced that condensation will form on the surface of the flange 56 facing the tip 39, condensation which could then enter the sensor assembly 12 and be detected. Additionally, condensation which may form on or run down the control casing 50 will be repelled by the opposite surface of the flange 56 and diverted before coming into contact with the water-sensing portion 38 within the sensor guard 40.

The flange 56 should be sufficiently thick to remain rigid and prevent the weight of the sensor assembly 12 from bending the flange 56 and allowing the sensor assembly 12 to come into contact with the walls of tank 10. It has been found that a disk-shape flange made using the DELRIN® material having water repellant properties and having a diameter of about 1 inch and a thickness of about 0.035 inches is sufficiently rigid to provide the desired spacing between the sensor assembly 12 and the inner surface of the outer wall 14.

Figure 3:
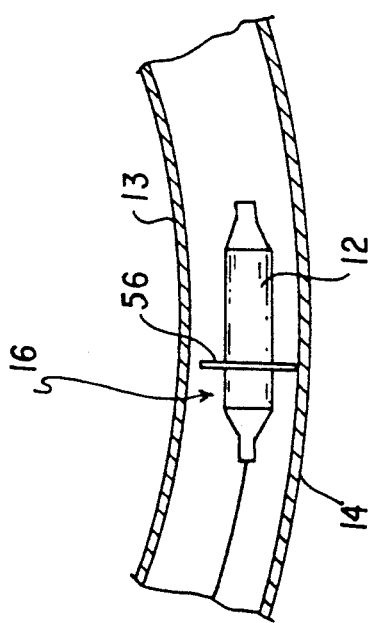
FIG. 3 is a cross-sectional view of a portion of the bottom of a double-wall tank with a sensor assembly, including one embodiment of the stand-off flange of the present invention, positioned therein.

FIG. 3 is a cross-sectional view of the sensor assembly 12 positioned in the bottom of the annular space 16 of the tank 10. The flange 56, secured around a portion of the sensor assembly 12, enables the sensor assembly 12 to remain spaced from the inner and outer walls 13 and 14. Thus, any condensation which may form within the annular space 16 and which pools at the bottom is less likely to contact the sensor assembly 12, and in particular, the water-sensing portion 38, than if the sensing assembly 12 was positioned directly on the inner surface of the outer wall 14. Because such contact between the sensor assembly 12 and condensation is substantially reduced or eliminated, the likelihood of activation of the sensor assembly 12 by condensation is substantially reduced, thereby substantially reducing false indications of leakage by the remote indicator.

The present invention can be inexpensively produced, distributed, and installed. An existing sensor assembly can be retro-fitted with the stand-off flange 56 or installation can wait until the sensor assembly is replaced following a leakage indication. Although the present invention has been described in detail, it should be understood that various changes, substitutions and alterations can be made herein without departing from the spirit and scope of the invention as defined by the attached claims. For example, the flange 56 can be made with other materials and have different shapes and dimensions than described herein to accommodate the installation of sensor assemblies in double-wall tanks having different configurations.

What is claimed is:

1. In an apparatus for indicating the presence of leakage between inner and outer walls of a double-wall tank, the apparatus comprising means for sensing such leakage, the improvement comprising:

means for substantially reducing contact between the sensing means and condensation which forms between the inner and outer walls, the source of condensation being one of a product and water, said means for substantially reducing contact including means for spacing the sensing means from the inner and outer walls wherein said means for spacing comprises a stand-off flange secured around a portion of the sensing means.

2. The apparatus of claim 1 wherein:

said sensing means has a cylindrical shape and a first radius; and said stand-off flange has a disk shape and a second radius at least about one-eighth of an inch greater than said first radius.

3. The apparatus of claim 2 wherein said second radius depends upon the spacing between the inner and outer walls of the tank.

4. The apparatus of claim 1 wherein said means for spacing comprises a moisture repellant material.

5. The apparatus of claim 4, wherein said material is DELRIN® having water repellant properties.

6. In an apparatus for indicating the presence of leakage between inner and outer walls of a double-wall tank, the apparatus comprising means for sensing such leakage and means for interconnecting joined to the sensing means, the improvement comprising:

means for substantially reducing contact between the sensing means and condensation which forms between the inner and outer walls, the source of condensation being one of a product and water, said means for reducing contact comprising means for spacing the sensing means from the inner and outer walls wherein said means for spacing comprises a stand-off flange to be positioned between the sensing means the interconnecting means.

7. A method for reducing false indications of leakage between the inner and outer wall of a double-wall tank, comprising the steps of:

providing sensing means;

spacing the sensing means from the inner surface of the outer wall, said step of spacing including securing a stand-off flange around a portion of the sensing means; and substantially reducing the potential for contact between the sensing means and condensation which forms between the inner and outer walls, the source of condensation being at least one of a product and water.

8. A method for reducing false indications of leakage between the inner and outer walls of a double-wall tank, comprising the steps of:

providing sensing means;

spacing the sensing means from the inner surface of the outer wall, said step of spacing including positioning a stand-off flange between the sensing means and a cable means; and substantially reducing the potential for contact between the sensing means and condensation which forms between the inner and outer walls, the source of condensation being one of a product and water.

9. The method of claim 7, further comprising said step of forming spacing means from a moisture repellant material.

10. The method of claim 7, further comprising the step of forming spacing means from DELRIN ® material having water repellant properties.

* * * * *